United States Patent [19]

Chan

[11] Patent Number: 4,898,090

[45] Date of Patent: Feb. 6, 1990

[54] DEVICE FOR THE PRODUCTION OF AROMA EXTRACTS FROM COFFEE OR TEA

[75] Inventor: Kwan W. Chan, West Point, Hong Kong

[73] Assignee: Melitta-Werke Bentz & Sohn, Minden, Fed. Rep. of Germany

[21] Appl. No.: 266,589

[22] Filed: Nov. 3, 1988

[30] Foreign Application Priority Data

Nov. 3, 1987 [DE] Fed. Rep. of Germany ....... 3737203

[51] Int. Cl.⁴ .............................................. A47J 31/02
[52] U.S. Cl. ..................................................... 99/306
[58] Field of Search ................. 99/306, 295, 279, 300, 99/316, 312, 323; 426/433, 81, 82; 210/473, 474, 477, 481

[56] References Cited

U.S. PATENT DOCUMENTS

| | | | |
|---|---|---|---|
| 807,286 | 12/1905 | King | 210/474 |
| 3,695,168 | 10/1972 | Brunt | 99/306 |
| 4,167,136 | 9/1979 | Chupurdy | 99/306 |
| 4,715,271 | 12/1987 | Kitagawa | 99/306 |

Primary Examiner—Robert W. Jenkins
Attorney, Agent, or Firm—Spencer & Frank

[57] ABSTRACT

An improved apparatus for the production of aromatic extracts from coffee or tea is of the type having a filter vessel and a collecting container, wherein the filter vessel has a plurality of detent lugs which are received within detent recesses disposed in an upper rim portion of the collecting container for detachable engagement therewith. This construction results in the secure connection of the filter vessel atop the collecting container, for preventing accidental detachment of the filter vessel while permitting intentional detachment of the filter vessel by proper manipulation of a handle portion of the filter vessel to disengage the detent lugs.

12 Claims, 1 Drawing Sheet

DEVICE FOR THE PRODUCTION OF AROMA EXTRACTS FROM COFFEE OR TEA

BACKGROUND OF THE INVENTION

The present invention relates to a device for the production of aroma extracts from coffee or tea, which includes a filter vessel for receiving the ground coffee or tea for producing a filtrate liquid, and a collecting container for the filtrate, wherein the filter vessel can be placed on top of the collecting container.

This type of device is needed for performing manual filtering operations as well as for machines for making coffee and tea. The ground coffee or tea is placed in the filter vessel which usually accommodates a paper filter therein. Then hot water is introduced into the filter vessel. By contacting the ground coffee or tea, the hot water extracts aromatics therefrom, the filtrate then flowing into the collecting container disposed beneath the filter vessel.

For performing manual filter operations, the filter vessel is manually placed atop the collecting container. Further, constructions for coffee and tea machines are known in which the filter vessel is fixedly connected to the housing of the coffee or tea machine.

Of particular relevance in the present invention are those devices in which the filter vessel is placed directly on the collecting container, and such devices are also used for coffee or tea machines. With this type of prior art construction, the danger exists that the filter vessel can be inadvertently knocked off the collecting container, especially as a result of careless handling during manual filtering operations.

SUMMARY OF THE INVENTION

It is an object of the present invention to provide an improved apparatus for production of aroma extracts from coffee or tea, having a selectively engageable and disengageable connection between a filter vessel and a collecting container which, when engaged, prevents unintentional detachment of the filter vessel from the collecting container.

The above and other objects are accomplished according to the invention by the provision of an improved apparatus for the production of aromatic extracts from coffee or tea of the type having a filter vessel and a collecting container, wherein the filter vessel has a plurality of detent lugs which are selectively engageable with corresponding detent recesses disposed in an upper rim portion of the collecting container.

The advantageous construction according to the invention makes possible a secure yet detachable connection between the filter vessel and the collecting container, such that the placement of the filter vessel correctly on the collecting container results in latching of the detent lugs within corresponding detent recesses so as to result in formation of a single structural unit. This secure connection eliminates the danger of unintentional detachment of the filter vessel from the collecting container.

For cleaning and easy handling of the collecting container subsequent to the filtering process, the filter vessel can be detached from the collecting container by deliberate manipulation of a handle portion of the filter vessel to move the detent lugs out of their respective latched positions.

DETAILED DESCRIPTION OF THE PREFERRED EMBODIMENT

Figure 1:
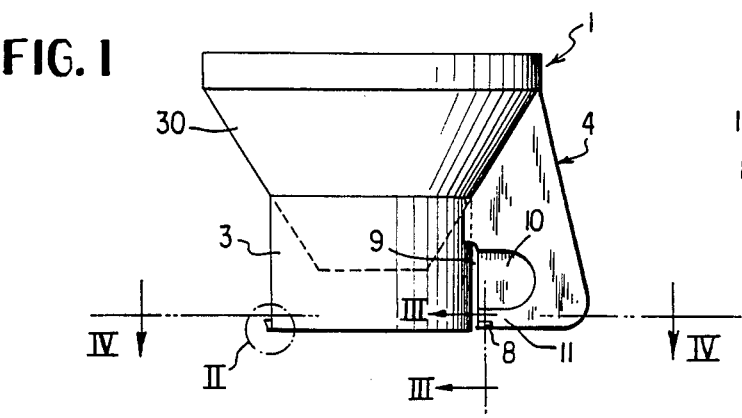
FIG. 1 is a side elevational view of a filter vessel according to a preferred embodiment of the present invention.
Figure 5:
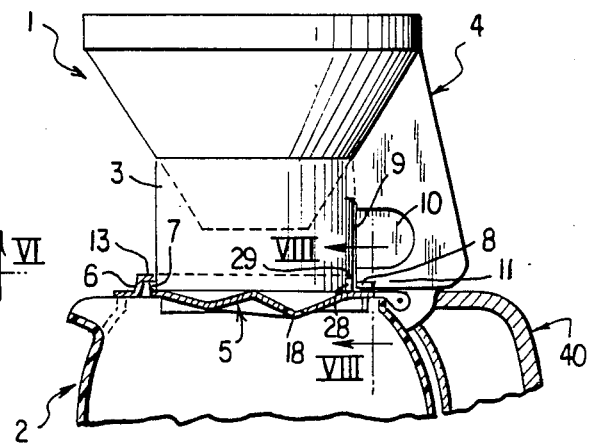
FIG. 5 is a side elevational view of the filter vessel disposed atop a collecting container, shown partially in section with a portion of the collecting container broken away to reveal a handle portion of the filter vessel of FIG. 1

FIG. 1 shows a filter vessel 1 which can be placed on a collecting container 2 (as shown in FIG. 5), the collecting container being, for example, a glass pot. The filter vessel 1 and the collecting container 2 together form a device for the production of aroma extracts from coffee or tea.

The filter vessel 1 has an upper portion 30 which has a generally conical shape, and a generally cylindrical socket 3 at its lower end which is adapted for placement on the collecting container 2. The filter vessel 1 also has a molded-on handle 4, which is preferably formed of a resiliently deformable material such as a plastic material. The handle 4 has a pair of lateral flanks, one of which is visible in FIG. 1 as lateral flank 11. The lateral flank 11 has handling depression 10 (only one visible) to permit a manual compression of the flanks 11. Along its lower end, the handle 4 is separated from the cylindrical socket 3 by a slot 9.

Figure 3:
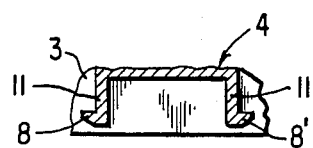
FIG. 3 is a sectional view taken along line III—III of FIG. 1.
Figure 2:
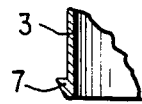
FIG. 2 is an enlarged sectional elevational view, shown broken away and in section, of the circled portion labeled II of FIG. 1.
Figure 4:
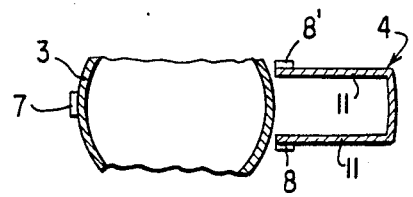
FIG. 4 is a sectional view taken along line IV—IV of FIG. 1.

As seen in FIGS. 2, 3, and 4, the socket 3 of the filter vessel 1 is provided in its lower rim region with a first detent lug 7 located on the lowermost portion of the cylindrical socket 3 on the side of the cylindrical socket 3 diametrically opposite the handle 4. Two additional detent lugs 8 and 8' are molded on each respective one of the pair of lateral flanks 11 (shown in FIGS. 3 and 4) along the lower edge of the handle 4.

The lower end region of the handle 4 is configured as a U-shaped hollow component which is open toward the cylindrical socket 3, as shown in section in FIG. 4. In this region, the handle 4 has a pair of lateral flanks 11, each of the lateral flanks 11 having a handling depression 10 (as shown in FIG. 1) to allow manual depression of the lateral flanks 11 toward each other. When the flanks 11 are not being urged toward each other, the detent lugs 8 and 8' are as shown in FIG. 4 and are disposed at a fixed distance apart. The lugs 8 and 8' each extend outwardly from the hollow region of the handle 5, are oriented generally tangentially to the socket 3, and are preferably molded to the respective ones of the supporting lateral flanks 11. Since the handle 4 is composed of a resiliently deformable plastic material, squeezing together of the lateral flanks 11 by application of manual pressure upon the respective handling depressions 10 results in deformation of the lateral flanks 11 toward each other, thereby bringing the two detent lugs 8 and 8' closer together. Release of the manual pressure allows the lateral flanks 11 to return to their respective original, undeformed configuration, thereby returning the two detent lugs 8 and 8' to their original, spaced-apart positions.

FIG. 5 shows a connected state of the filter vessel and the collecting container, the collecting container 2 having a lid 5 which is preferably made of plastic. The collecting container 2 has a handle 40, shown partially broken away in this figure. The lid 5 has a centering ring 6 into which the socket 3 of the filter vessel 1 is partly received in the connected state; in this figure, the centering ring 6 is shown partially broken away to reveal the nearest one of the lateral flanks 11 and its corresponding detent lug 8. The lid 5 of the collecting container 2 has a detent projection 13 which overlies the detent lug 7, thereby preventing dislodgment of the filter vessel 1 from atop the collecting container 2.

Figure 6:
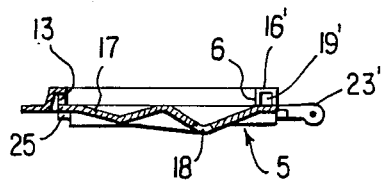
FIG. 6 is a sectional view taken along line VI—VI of FIG. 7.

As shown in FIG. 6, the lid 5 has a bottom surface 17 having a drainage opening 18 therein. The centering ring 6 supports a projecting wall 16'. A member 23' extends from the lid 5.

Figure 7:
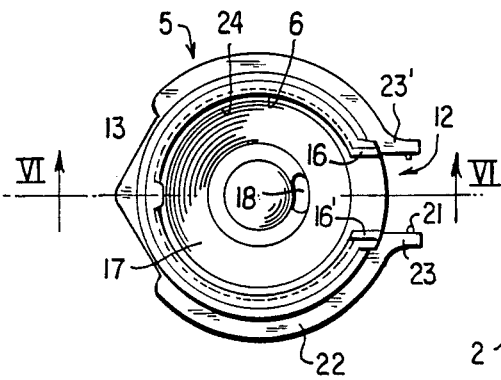
FIG. 7 is a top plan view of a lid of the collecting container of FIG. 5.

FIG. 7 is a top elevational view of the lid 5, showing the centering recess 12 which is located between projecting walls 16 and 16'. The centering ring 6 is shown as a channel-shaped member surrounded by a flange 22 disposed along the perimeter of the lid 5 except in the vicinity of the centering recess 12.

The centering recess 12 of the lid 5 of the collecting container 2 as seen in FIG. 7 is adapted for receiving the handle 4 of the filter vessel in the connected configuration. The detent projection 13 is disposed on a portion of the centering ring 6 of the lid 5 which is diametrically opposite the centering recess 12, and projects inwardly toward the center of the lid 5. The detent projection 13 is adapted to engage with the detent lug 7 of the socket 3 when the filter vessel 1 is correctly positioned atop the container 2.

Figure 8:
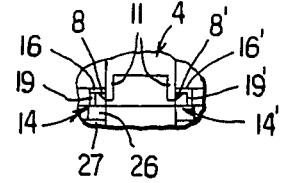
FIG. 8 is a schematic side view taken along line VIII—VIII of FIG. 5, showing a latched engagement of projecting lugs on the handle portion of the filter vessel with corresponding detent recesses in the lid of the collecting container.

As seen in FIG. 8, the projecting walls 16 and 16' of the lid 5 define upper surfaces of respective recesses 14 and 14' in which the respective detent lugs 8 and 8' engage when the handle 4 is correctly lowered fully into the centering recess 12. In this figure, the projecting walls 16 and 16' and the bottom surface of the lid 5 are seen as bounding the recesses 14 and 14'. The detent lugs 8 and 8' are retained in the respective recesses 14 and 14' in the connected configuration, which prevents removal of the filter vessel from the collecting container unless the detent lugs 8 and 8' are moved out of the corresponding recesses 14 and 14', to in turn permit removal of the detent lug 7 from beneath the detent projection 13.

In one method of assembling the filter vessel 1 and the collecting container 2 to form the connected configuration, the filter vessel 1 is positioned and lowered until the detent lug 7 directly overlies the detent projection 13, and then is brought down further with sufficient force that, owing to the sloped lower surface of the detent projection 7 and its abutment with the innermost edge of the detent projection 13, the centering ring 6 and the socket 3 are relatively deformed sufficiently to permit the detent lug 7 to pass below the detent projection 13, after which the centering ring 6 and the socket 3 return to their relatively undeformed conditions to thereby move the detent lug 7 into its retained position beneath the detent projection 13. The handle 4 can be simultaneously lowered such that the detent lugs 8 and 8' correspondingly engage the projecting walls 16 and 16' until the handle 4 deforms inwardly in the region of the lateral flanks 11 to enable the detent lugs 8 and 8' to pass beneath the projecting walls 16 and 16', and thereafter return to their unbiased configurations so that the detent lugs 8 and 8' are disposed beneath the projecting walls 16 and 16'. The handle 4 can alternatively be squeezed in the region of the handling depressions 10 during the connection operation to permit the detent lugs 8 and 8' to pass beneath the projecting walls 16 and 16', after which the handle 4 can be released to secure the connected configuration of the filter vessel 1 and the collecting container 2.

In an alternative manner of assembling the filter vessel and the collecting container 2, the filter vessel 1 can be tilted and moved such that the detent lug 7 is disposed beneath the detent projection 13 prior to lowering of the handle 4 fully into the centering recess 12. After the first detent lug 7 is positioned beneath the detent projection 13, the lugs 8 and 8' are engaged in recesses 14 and 14' as shown in FIG. 8 by lowering of the handle 4 downwardly in a pivoting motion about the detent projection 13 into the centering recess 12 until the lower surfaces of the detent lugs 8 and 8' engage the respective upper surfaces of the projecting walls 16 and 16', which, due to the inclined shape of the respective undersides of the detent lugs 8 and 8', causes the lateral flanks 11 to be urged toward each other until there is sufficient clearance for the detent lugs 8 and 8' to pass beneath the respective projecting walls 16 and 16'. When the detent lugs 8 and 8' are both disposed within the respective recesses 14 and 14', the lateral flanks 11 can return to their unstressed positions, thereby disposing the detent lugs 8 and 8' beneath the respective walls 16 and 16'.

As seen in FIG. 8, the projecting walls 16 and 16' are respectively supported by adjacent portions of the centering ring 6 which is connected to the lid 5. Upon accidental disturbance of the filter vessel 1, when removal of the filter vessel 1 is not intended, the handle 4 is retained in position by engagement of the upper surfaces of the detent lugs 8 and 8' with the lower surfaces of the projecting walls 16 and 16', thereby retaining the handle 4 within the centering recess 12.

The engagement of the lugs 8 and 8' in the respective recesses 14 and 14', together with the engagement of the first detent lug 7 with the recess 17, results in a secure, three-point fastening of the filter vessel 1 to the lid 5. The lid 5 can be firmly fixed to the collecting container 2 in any known manner.

The filter vessel 1 can be removed by intentionally pressing together the lateral flanks 11 in the hollow region of the handle 4 together, resulting in the release of the engagement of the detent lugs 8 and 8' from the respective detent recesses 14 and 14'.

Furthermore, it is also possible as a variation of the foregoing embodiment to effect the fastening of the detent lugs 8 and 8' to the collecting container 2 (and, therefore, the tip-proof connection between the filter vessel 1 and the collecting container 2), without use of the lid 5. This can be done by directly providing the upper rim of the collecting container 2 with a detent projection and detent recesses corresponding to the detent projection 13 and the detent recesses 14 and 14' of the lid 5, with which the detent lugs 7, 8, and 8' of the filter vessel 1 can respectively engage.

In general, however, it is advantageous to employ the embodiment shown in FIGS. 1-8 having the lid 5 since a lid would usually be employed for the collecting container 2 subsequent to removal of the filter vessel 1 in any case, and furthermore because the lid 5 is preferably made of plastic which can be readily provided with the appropriate shape having the detent recesses 14 and 14' as well as the detent projection 13.

The apparatus according to the present invention can be used for the production of aroma extracts from coffee or tea by manual as well as by automatic operations, e.g., with coffee or tea machines.

The present disclosure relates to the subject matter disclosed in German Application No. P 37 37 203.3 of Nov. 3rd, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a apparatus for the production of aroma extracts from coffee or tea including a filter vessel for receiving coffee or tea and a collecting container for receiving the filtrate from the filter vessel, said filter vessel and said collecting container having cooperating zones for removably supporting said filter vessel on said collecting container, the improvement comprising:
    a plurality of detent means provided on said filter vessel in said zone,
    detent recesses provided on said collecting container in said zone and arranged for receiving respective said detent means when the filter vessel is positioned on said collecting container for releasably locking said filter vessel to said collecting container by said detent means,
    a centering ring mounted on the collecting container; and recesses being disposed in a region adjacent said centering ring;
    a socket forming part of the filter vessel; said centering ring being adapted for receiving said socket; and
    a lid being fixedly connected to the collecting container; said centering ring being a portion of said lid.

2. An apparatus according to claim 1 wherein said lid has a centering recess for receiving and centering said handle.

3. An apparatus according to claim 2, wherein two of said detent recesses are disposed on said lid along opposite sides of said centering recess.

4. An apparatus according to claim 3, wherein each of said two detent recesses are respectively formed by a projecting wall.

5. An apparatus according to claim 2, wherein another detent recess is delimited by a detent projection and is disposed on a region of said lid which is diametrically opposite to said centering recess and which is fixedly connected to said centering ring.

6. An apparatus according to claim 5, wherein each of said plurality of detent means can be respectively disposed beneath corresponding ones of said detent recesses during insertion of said socket into said centering ring by resilient deformation of said handle, such that the filter vessel is attached to the collecting container in a connected configuration.

7. An apparatus according to claim 1, wherein said detent recesses are molded in said lid, and said lid is composed of plastic material.

8. In an apparatus for the production of aroma extracts from coffee or tea including a filter vessel for receiving coffee or tea and a collecting container for receiving the filtrate from the filter vessel, said filter vessel and said collecting container having cooperating zones for removably supporting said filter vessel on said collecting container, the improvement comprising: a socket provides an raid filter vessel,
    a plurality of detent means provided on said filter vessel in said zone,
    detent recesses provided on said collecting container in said zone and arranged for receiving respective said detent means when the filter vessel is positioned on said collecting container for releasably locking said filter vessel to said collecting container by said detent means, and
    a handle molded to the filter vessel; said handle having a region thereof separated from said socket by a slot, said handle having two lateral flanks delimiting a hollow region in a lower end portion thereof, at least two of said plurality of detent means being respectively supported by respective ones of said lateral flanks, each of said detent means extending outwardly from its respective supporting lateral flank relative to said hollow region.

9. An apparatus according to claim 8, wherein another one of said plurality of detent means is fixedly connected to a lower end region of said socket at a portion of said socket which is diametrically opposite the lower end region of said handle.

10. An apparatus according to claim 9, wherein said socket is molded together with said another one of said detent projections, and said socket is composed of plastic material.

11. An apparatus according to claim 8 wherein each of said lateral flanks having a depression therein adapted to facilitate manual handling thereof, whereby said lateral flanks can be pressed together by manual engagement of both said depressions to remove said detent means from engagement with corresponding ones of said recesses.

12. An apparatus according to claim 8 wherein said handle is molded together with said two detent means which are supported by said handle.

* * * * *